United States Patent
Destraves et al.

(10) Patent No.: US 12,337,622 B2
(45) Date of Patent: Jun. 24, 2025

(54) DEVICE FOR MEASURING AN OPERATING VARIABLE OF A TYRE

(71) Applicants: SAFRAN, Paris (FR); SAFRAN ELECTRONICS & DEFENSE, Paris (FR); SAFRAN LANDING SYSTEMS, Velizy Villacoublay (FR); COMPAGNIE GENERALE DES ETABLISSEMENTS MICHELIN, Clermont-Ferrand (FR)

(72) Inventors: Julien Destraves, Clermont-Ferrand (FR); Lionel Fagot-Revurat, Clermont-Ferrand (FR); Éric Bailly, Moissy-Cramayel (FR); Antoine Canu, Moissy-Cramayel (FR); David Vera, Moissy-Cramayel (FR)

(73) Assignees: SAFRAN, Paris (FR); SAFRAN ELECTRONICS & DEFENSE, Paris (FR); SAFRAN LANDING SYSTEMS, Velizy-Villacoublay (FR); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 115 days.

(21) Appl. No.: 17/913,065

(22) PCT Filed: Mar. 22, 2021

(86) PCT No.: PCT/EP2021/057312
§ 371 (c)(1),
(2) Date: Sep. 20, 2022

(87) PCT Pub. No.: WO2021/191165
PCT Pub. Date: Sep. 30, 2021

(65) Prior Publication Data
US 2023/0166570 A1 Jun. 1, 2023

(30) Foreign Application Priority Data
Mar. 22, 2020 (FR) .................... 2002782

(51) Int. Cl.
*G01L 17/00* (2006.01)
*B29D 30/00* (2006.01)
(Continued)

(52) U.S. Cl.
CPC ...... *B60C 23/0493* (2013.01); *B29D 30/0061* (2013.01); *B60C 23/0452* (2013.01);
(Continued)

(58) Field of Classification Search
CPC ........... B60C 23/0493; B60C 23/0452; B29D 30/0061; B29D 2030/0072; G01L 9/0052;
(Continued)

(56) References Cited

U.S. PATENT DOCUMENTS 6,082,192 A * 7/2000 Koch ...................... B60C 19/00
73/146
6,772,505 B1 * 8/2004 Logan ................. B60C 23/0493
29/601
(Continued)

FOREIGN PATENT DOCUMENTS

EP 1000776 A2 5/2000
EP 1547823 A2 6/2005
(Continued)

*Primary Examiner* — Freddie Kirkland, III
(74) *Attorney, Agent, or Firm* — MUNCY, GEISSLER, OLDS & LOWE, P.C.

(57) ABSTRACT

A device for measuring an operating variable, to be fitted onto a tire, includes an electronic circuit distributed over a first face of an electronic board and including a sensor, a protective housing at least partially covering the electronic circuit and at least one first antenna wire having one end galvanically connected to the electronic circuit and integrally extending so as to project laterally from the housing.

(Continued)

The housing includes a lateral portion which projects substantially tangentially to a proximal end portion of the first wire in accordance with the generatrix of the first wire.

17 Claims, 7 Drawing Sheets

(51) Int. Cl.
| | | |
|---|---|---|
| B60C 23/04 | (2006.01) | |
| G01L 9/00 | (2006.01) | |
| G01L 19/00 | (2006.01) | |
| G01L 19/06 | (2006.01) | |
| G01L 19/08 | (2006.01) | |
| G01L 19/14 | (2006.01) | |
| H01Q 1/22 | (2006.01) | |
| H01Q 9/28 | (2006.01) | |

(52) U.S. Cl.
CPC ............ *G01L 9/0052* (2013.01); *G01L 17/00* (2013.01); *G01L 19/0084* (2013.01); *G01L 19/06* (2013.01); *G01L 19/086* (2013.01); *G01L 19/143* (2013.01); *G01L 19/148* (2013.01); *H01Q 1/2241* (2013.01); *H01Q 9/28* (2013.01)

(58) Field of Classification Search
CPC ..... G01L 17/00; G01L 19/0084; G01L 19/06; G01L 19/086; G01L 19/143; G01L 19/148; H01Q 1/2241; H01Q 9/28
See application file for complete search history.

(56) References Cited

U.S. PATENT DOCUMENTS

| | | | | |
|---|---|---|---|---|
| 7,810,387 | B2* | 10/2010 | Robert | H01R 13/5845 |
| | | | | 73/146 |
| 8,462,077 | B2* | 6/2013 | Sinnett | H01Q 1/2225 |
| | | | | 340/572.1 |
| 9,070,069 | B2* | 6/2015 | Sinnett | B60C 23/0493 |
| 9,457,628 | B2* | 10/2016 | Robert | B29C 45/14639 |
| 10,974,553 | B2* | 4/2021 | Destraves | B60C 23/0452 |
| 11,169,042 | B1* | 11/2021 | Riou | G01L 19/0654 |
| 11,505,011 | B2* | 11/2022 | Lallement | G06K 19/07764 |
| 11,618,288 | B2* | 4/2023 | Noel | G06K 19/07764 |
| | | | | 152/450 |
| 11,981,166 | B2* | 5/2024 | Destraves | B60C 23/0452 |
| 2005/0132789 | A1* | 6/2005 | Starinshak | H01Q 1/2241 |
| | | | | 73/146 |
| 2006/0017553 | A1* | 1/2006 | Cook | B60C 23/0493 |
| | | | | 340/447 |
| 2006/0070230 | A1* | 4/2006 | Logan | B60C 23/0493 |
| | | | | 29/601 |
| 2007/0274030 | A1 | 11/2007 | Rober | |
| 2010/0108211 | A1* | 5/2010 | Fenkanyn | B60C 23/0493 |
| | | | | 152/152.1 |
| 2010/0122757 | A1* | 5/2010 | Lionetti | B60C 23/0493 |
| | | | | 152/152.1 |
| 2012/0305151 | A1* | 12/2012 | Robert | B60C 23/0452 |
| | | | | 361/679.01 |
| 2013/0153669 | A1* | 6/2013 | Sinnett | G06K 19/07764 |
| | | | | 235/492 |
| 2020/0070598 | A1 | 3/2020 | Noel | |
| 2020/0079159 | A1* | 3/2020 | Destraves | H01Q 1/2241 |
| 2021/0245553 | A1* | 8/2021 | Lafort | B60C 11/243 |
| 2021/0348977 | A1* | 11/2021 | Riou | G01L 17/00 |
| 2023/0150315 | A1* | 5/2023 | Canu | B60C 23/0493 |
| | | | | 340/447 |
| 2023/0161993 | A1* | 5/2023 | Lin | H05K 1/181 |
| | | | | 73/146.2 |

FOREIGN PATENT DOCUMENTS

| | | |
|---|---|---|
| EP | 2182576 A1 | 5/2010 |
| WO | WO2012030321 A1 | 3/2012 |
| WO | WO2020043744 A1 | 3/2020 |

* cited by examiner

DEVICE FOR MEASURING AN OPERATING VARIABLE OF A TYRE

The present invention relates to a device for measuring an operating variable of a tyre of a vehicle, such as an aircraft.

BACKGROUND OF THE INVENTION

Conventionally, an aircraft wheel comprises a rim and a tyre received on the rim, the rim and the tyre delimiting an inner volume filled with a pressurised gas. Regulations impose to measure the pressure of the gas contained in the tyre at least once a day. In case of under-inflation of the tyre, the aeroplane is not authorised to take off and a maintenance operation must be performed.

The pressure measurement of the gas contained in the tyre is generally taken manually using a manometer connected to an inflation valve integral with the rim and in communication with the inner volume.

Tyres fitted with a pressure measuring device embedded inside the tyre to facilitate maintenance operations of the ground are known. The pressure measuring device collects digital data relating to the pressure of the gas contained in the tyre and transmits these data by radioelectric waves to a reader arranged remotely, without needing to touch the tyre or perform any manual operation.

Such a pressure measuring device generally comprises a housing extending around an electronic board provided with a pressure sensor and a radio transceiver It further comprises a helically-shaped antenna extending so as to project laterally from the housing, and of which one end is galvanically connected to the radio transceiver, for example via a welding or a soldering.

During the rotation of the tyre, the pressure measuring device is subjected to stresses and deformations which are transmitted to the antenna. The hel²ical shape gives the antenna a certain flexibility, enabling it to be deformed and thus improve its endurance vis-à-vis the stresses that it undergoes.

However, the stresses undergone by the antenna are concentrated at its end which is rigidly fixed to the electronic board. The antenna therefore risks breaking at its connection with the electronic board, which on the one hand, would make its electronic function inoperative, and on the other hand, would have a risk of damage for the tyre.

OBJECT OF THE INVENTION

The invention therefore has the object of proposing a device for measuring an operating variable of a vehicle tyre enabling to at least partially prevent the abovementioned problem.

SUMMARY OF THE INVENTION

To this end, according to the invention, a measuring device is provided, comprising:
- an electronic circuit distributed over a first face of an electronic board and which comprises a sensor;
- a protective housing at least partially covering the electronic board;
- at least one first antenna wire having one end galvanically connected to the electronic circuit and extending so as to project laterally from the housing.

According to the invention, the housing comprises a lateral portion which projects substantially tangentially to a proximal end portion of the first wire in accordance with a generatrix of said first wire.

Such a lateral portion enables, during the rotation of the tyre, to limit the deformations and therefore the stresses locally close to the end of the first wire connected to the electronic circuit. The endurance of the first wire vis-à-vis the stresses that it undergoes is improved, which enables to limit the risks of breaking of the first wire at its connection with the electronic circuit.

Particularly, the housing comprises a first portion partially covering the first face, and a second portion partially covering a second face of the electronic board opposite the first face and having at least one bottom intended to extend in the vicinity of an inner surface of the tyre.

Particularly, the protective housing comprises at least one channel putting the electronic circuit in fluid communication with the outside of the housing.

Particularly, the generatrix of the first wire is parallel to the first face.

Particularly, the lateral portion comprises at least one finger substantially tangent to the proximal end section of the first wire in a plane perpendicular to the first face.

Particularly, the first wire has a shape comprised in the following group: straight, helical, meander, wavy.

Particularly, a protective shroud at least partially covers the electronic board, the housing and the first wire.

Particularly, the protective shroud is made of elastomer material.

Particularly, the elastomer material cross-links at a temperature less than 100° C.

Particularly, at least one section of the first wire has a geometric pattern repeated in accordance with a pitch P, the projection of the geometric pattern over a plane perpendicular to the generatrix of the first wire being circumscribed in a circle of diameter D, such that P/D<0.7.

Particularly, the first wire comprises a first section facing the lateral portion of the housing and having a first geometric pattern repeated in accordance with a first pitch, and a second portion remote from the lateral portion of the housing and having a second geometric pattern repeated in accordance with a second pitch, the first pitch being greater than the second pitch.

Particularly, the device comprises a second antenna wire having one end galvanically connected to the electronic circuit and extending so as to project laterally from the housing, so as to form a dipole antenna with the first wire.

Particularly, the invention also relates to a tyre comprising such a measuring device and an element for fixing the device on an inner surface of the tyre.

Particularly, the fixing element is a patch which covers the device and a part of the inner surface around the device.

The invention also relates to a wheel comprising such a tyre.

The invention further relates to an aircraft landing gear comprising at least one such wheel.

The invention will be better understood on reading the following description that is given merely by way of non-limiting illustration of the invention.

BRIEF DESCRIPTION OF THE DRAWINGS

Reference is made to the accompanying drawings, in which.

DETAILED DESCRIPTION OF THE INVENTION

Figure 1A:
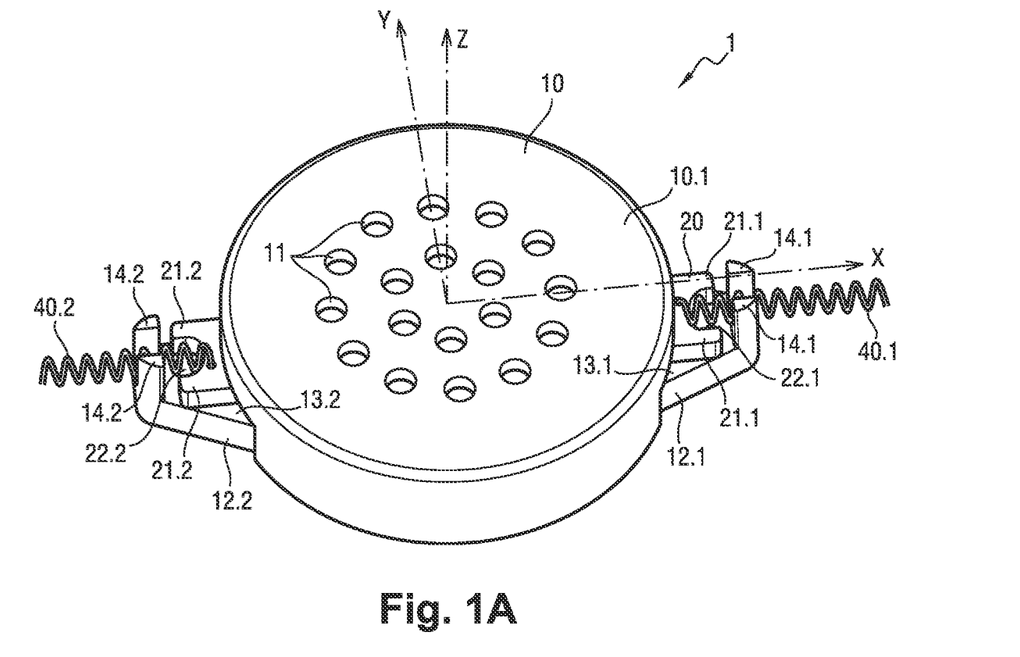
FIG. 1A is a perspective view of a pressure measuring device according to a first embodiment of the invention.
Figure 1B:
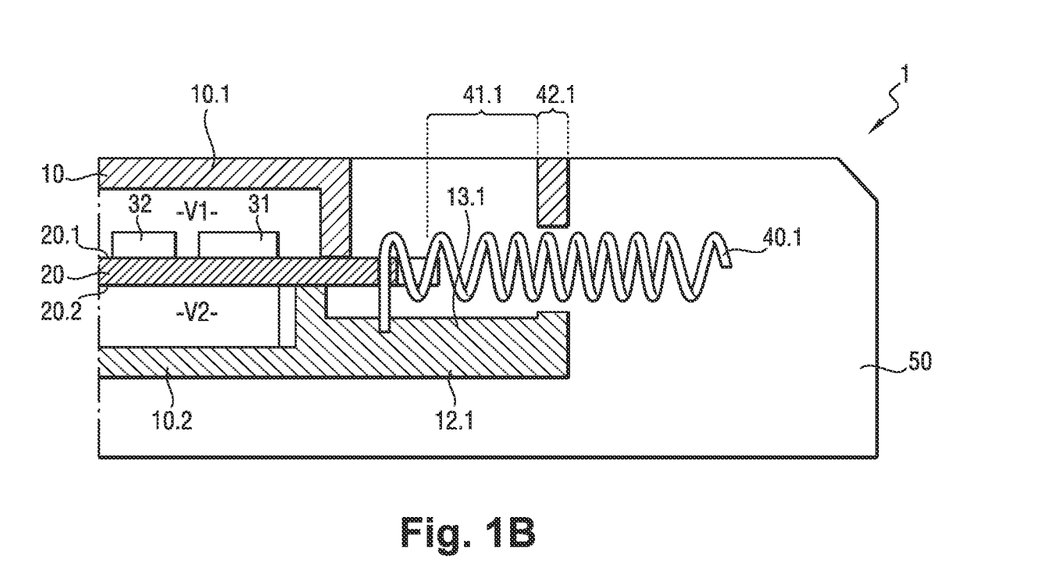
FIG. 1B is a schematic cross-sectional view of the pressure measuring device illustrated in FIG. 1A, housed in an elastomer material.
Figure 1C:
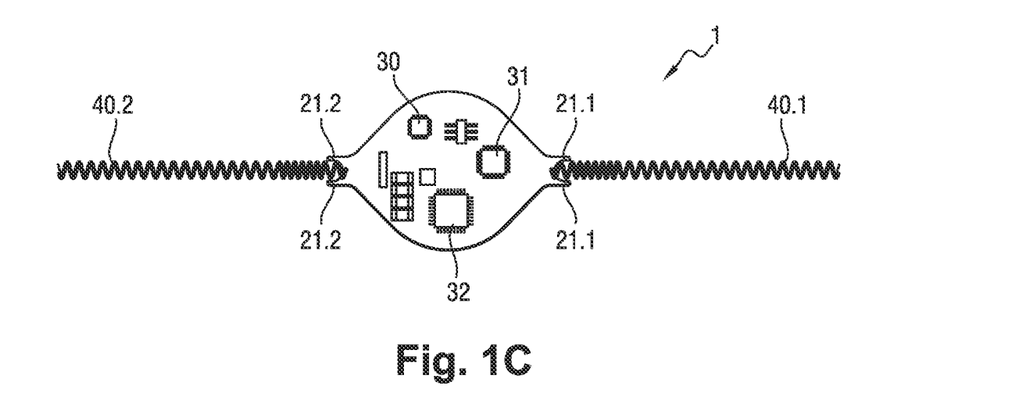
FIG. 1C is a top view of the electronic board of the pressure measuring device illustrated in FIG. 1A.

In reference to FIGS. 1A, 1B and 1C, a pressure measuring device according to a first embodiment of the invention, generally referenced as 1, comprises a phenolic resin housing 10, here mainly in the shape of a straight cylinder, extending along a vertical axis Z. The housing 10 comprises a first portion 10.1 and a second portion 10.2 arranged on either side of an electronic board 20 extending in a horizontal plane XY. The housing 10 thus delimits an enclosure in which extends at least partially the electronic board 20.

The first portion 10.1 of the housing 10 delimits a first volume V1 with a first face 20.1 of the electronic board 20 and forms a cover having an upper, flat-shaped surface. The first portion 10.1 of the housing comprises first through channels 11 putting the first volume V1 in fluid communication with the outside. The first channels have a circular section, the diameter of which is between 0.2 and 1.5 millimetres, preferably 1 millimetre.

The second portion 10.2 of the housing 10 delimits a second volume V2 with a second face 20.2 of the electronic board 20 opposite the first face 20.1, and forms a container having a flat-shaped bottom. The connection between the housing 10 and the electronic board 20 is arranged so as to enable a relative movement between said housing 10 and said electronic board 20, for example via a flexible, silicone-based glue bead.

The electronic board 20 comprises second channels (not represented here) putting the first volume V1 in fluid communication with the second volume V2. The second channels have a circular section, the diameter of which is between 100 and 300 micrometres, preferably 200 micrometres.

As illustrated in FIG. 1C, an electronic circuit extends over the first face 20.1 of the electronic board 20 and comprises a passive pressure sensor 30, a radio transceiver 31 and a microcontroller 32.

The pressure sensor 30, the radio transceiver 31 and the microcontroller 32 are mounted on the first face 20.1 of the electronic board 20 and extend into the first volume V1.

The pressure sensor 30 comprises a mechanical protective cap defining a sealed measuring enclosure. The pressure sensor 30 is here a piezoresistive sensor comprising a membrane which extends substantially parallel to the first face 20.1 of the electronic board 20. The sensor is here an electromechanical microsystem (or MEMS) with a Wheatstone bridge. A third channel (not represented here) crosses the electronic board 20 and puts the enclosure delimited by the cap in fluid communication with the second volume V2. The third channel has a circular section, the diameter of which is substantially equal to that of the second channels 21.

The electronic board 20 comprises a first pair of arms 21.1 extending so as to project laterally from the housing 10 along a horizontal axis X perpendicular to the axis Z. The first pair of arms 21.1 forms a first notch 22.1 inside which extends one end of a first antenna wire 40.1 galvanically connected to the radio transceiver 31. The first wire 40.1 is constituted of a steel wire wound in a helically-shaped spring in accordance with a pitch P and extends so as to project laterally from the housing 10 along the axis X. The projection of the first wire 40.1 over a plane YZ perpendicular to the axis X is circumscribed in a circle of diameter D. A P/D ratio less than 0.7 makes it possible to improve the performances of the antenna in terms of emitting and receiving, but also of decreasing the rigidity of the helical wire and therefore of limiting the stresses generated in the first wire 40.1, in particular at its galvanic connection with the radio transceiver 31.

The electronic board 20 further comprises a second notch 22.2 formed by a second pair of arms 21.2 identical to the first pair of arms 21.1 and extending opposite said first pair of arms 21.1. An end of a second identical spring antenna wire 40.2 extends inside the second notch 22.2 and is galvanically connected to the radio transceiver 31. The first wire 40.1 and the second wire 40.2 are substantially identical and constitute a dipole antenna.

The second housing portion 10.2 comprises a first lug 12.1 projecting along the axis X. The first lug 12.1 partially extends facing the first notch 22.1 and comprises a horizontal inner face 13.1 substantially tangentially to a first section 41.1 of the first wire 40.1. Two first fingers 14.1 extend parallel along the axis Z from a free end of the inner face 13.1 extending beyond the first notch 22.1 and forms a space for receiving a second section 42.1 of the first wire 40.1. The first fingers 14.1 comprise an inner surface substantially tangentially vertically to the second section 42.1 of the first wire 40.1.

The second housing portion 10.2 further comprises a second lug 12.2 projecting identically to the first lug 12.1 and arranged opposite said first lug 12.1. The second lug 12.2 partially extends facing the second notch 22.2 and comprises a horizontal upper face 13.2 substantially tangentially to a first portion 41.2 of the second wire 40.2. Two second fingers 14.2 extend parallel along the axis Z from a free end of the upper face 13.2 extending beyond the second notch 22.2 and forms a space for receiving a second section 42.2 of the second wire 40.2. The second fingers 14.2 comprise an inner surface substantially tangentially vertically to the second section 42.2 of the second wire 40.2.

The first lug 12.1 and the second lug 12.2 thus extend outside of the enclosure delimited by the housing 10.

The second section 42.1 of the first wire 40.1 and the second section 42.2 of the second wire 40.2 respectively have a pitch less than that of the first section 41.1 of the first wire 40.1 and of the first section 41.2 of the second wire 40.2. This pitch difference makes it possible to increase in service, the number of contact points between the wires 40.1, 40.2 and the second housing portion 10.2 during the articulation of said wires 40.1, 40.2, and therefore to decrease the local stresses to which the housing 10 are subjected, in particular at the fingers 14.1, 14.2. It makes it possible also to form a certain flexibility at the second sections 42.1, 42.2 of the wires 40.1, 40.2, and therefore to facilitate the articulation of said wires 40.1, 40.2, while decreasing the forces crossing at their galvanic connection with the radio transceiver 31.

If an increase of the pitch of the second sections 42.1, 42.2 makes it possible to improve the performances of the antenna in radiofrequencies, it also causes an increase in the rigidity of the wires 40.1, 40.2 and therefore an increase in the forces crossing at their galvanic connection with the radio transceiver 31. Subsequently, a compromise between the mechanical strength and the performance of the antenna is to be identified according to the final use of the device 1.

Figure 2:
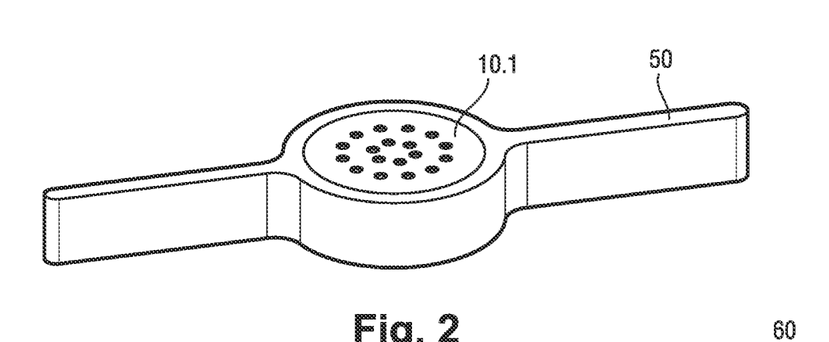
FIG. 2 is a perspective view of the pressure measuring device illustrated in FIG. 1B.

As illustrated in FIG. 2, the device 1 is covered with a protective shroud 50 made of an elastomer material, preferably cross-linking at a temperature less than 100° C., for example polysiloxane- or silicone-based, as that named "silastene" which is a silicone-based elastomer material. The protective shroud 50 covers the first wire 40.1, the second wire 40.2, the housing 10 and the portions of the electronic board 20 not covered by the housing 10.

The protective shroud 50 electrically insulates the device 1 in that the electrical conductivity of the elastomer material is less than its percolation threshold of the conductive charges, which improves the performances of the antenna in terms of emission and reception. The dielectric permittivity of the elastomer material will be preferably less than 10, advantageously less than 6, and very preferably less than 3, as is the case for "silastene", the dielectric permittivity of which is equal to 2.83.

In a preferred embodiment, the elastomer material is first deposited on the housing 10 in a semi-liquid state in order to facilitate the moulding of the mechanical and electronic components of the device 1 and enable air to escape, in particular at the antenna wires 40.1, 40.2, the geometry of which favours the formation of air bubbles. The elastomer material is then rigidified during a cross-linking step performed preferably at a temperature less than 100° C. to avoid any deterioration of the electronic components. With no air bubble, the protective shroud 50 is closely linked homogenously to the different mechanical and electronic components, which ensures a robustness in the performances of the antenna and of the anchoring of the mechanical and electronic components within the protective shroud 50.

Preferably, the anchoring of the mechanical and electronic components within the protective shroud 50 is performed with no adhesion phenomenon in order to improve the endurance of the protective shroud 50, and therefore of the device 1, by minimising the concentration of stresses at the origin of cracking phenomena. Such an anchoring is obtained by using a silicone-based elastomer like "silastene" which is chemically inert with numerous materials. The choice of the elastomer material depends on the material of the antenna wires 40.1, 40.2 with which the protective shroud 50 will be in contact. "Silastene", for example, makes it possible to avoid this adhesion phenomenon with the antenna wires 40.1, 40.2 made fully of steel or having an outer brass coating layer.

The protective shroud 50 is arranged to completely envelope the device 1 and limit the deformation of the antenna wires 40.1, 40.2 due to urges external to the device 1, in particular along the axis X. Indeed, the elasticity of the elastomer material enables movements of the antenna wires 40.1, 40.2, while limiting them, and limits the forces crossing into said antenna wires 40.1, 40.2. The shroud thus makes it possible to reduce the articulations of the antenna with respect to air and to the abutments of the lateral portions, and to offer other pathways for the stresses and deformations resulting from the urges being exerted in service on the antenna. Thus, a concentration of the stresses is avoided by favouring a homogenisation of it on a larger surface. Through its elastomeric composition, the protective shroud 50 makes it possible to reduce the stresses undergone by the wires 40.1, 40.2, in particular at their galvanic connection with the radio transceiver 31, and to distribute them along the generatrices of said wires 40.1, 40.2. The choice of an elastomer material cross-linking at ambient temperature enables a burning-in of the protective shroud 50 in the presence of the electronic board 20 without deterioration of the electronic components which compose it.

Figure 4:
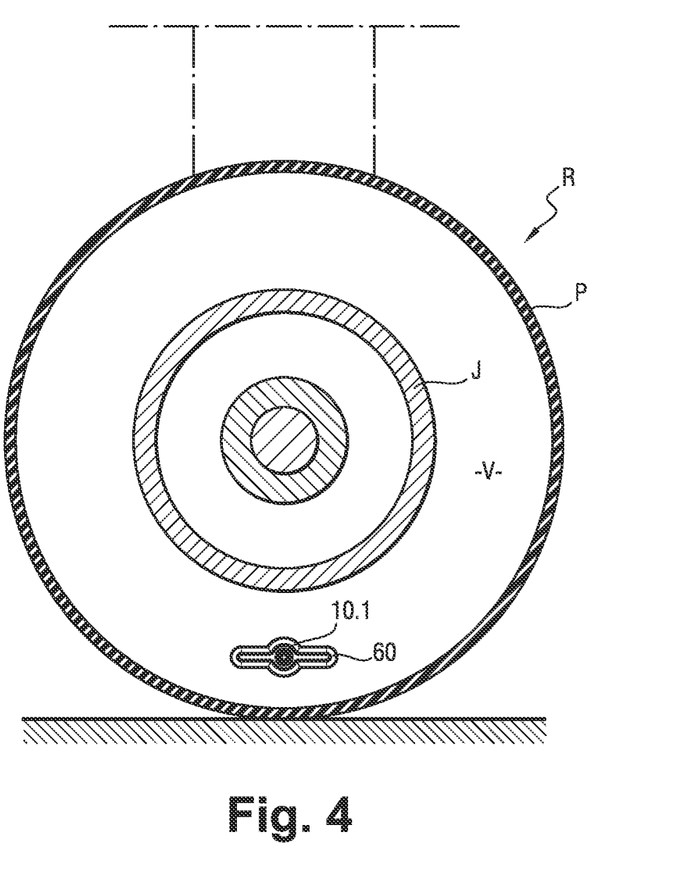
FIG. 4 is a schematic, cross-sectional view of an aircraft wheel provided with the pressure measuring device illustrated in FIG. 2 which is fixed on an inner surface of the tyre using the patch illustrated in FIG. 3.

As illustrated in FIG. 4, the device 1 thus protected is placed inside a wheel R of an aircraft.

Figure 3:
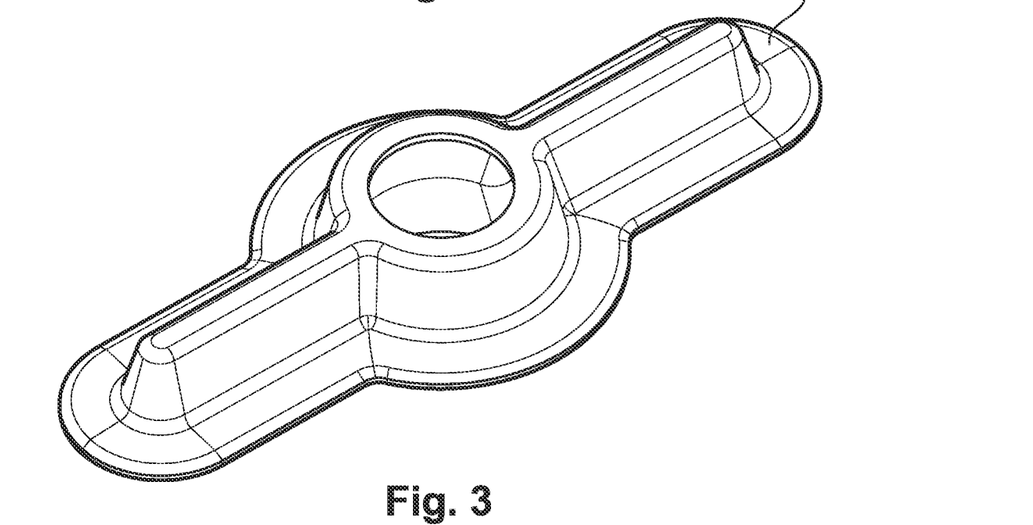
FIG. 3 is a perspective view of a patch made of elastomer material enabling to fix the overmoulded pressure measuring device illustrated in FIG. 2 on the inner surface of a tyre.

The wheel R comprises a rim J on which a tyre P is mounted, defining with the rim J an inner volume V filled with pressurised air. In a known manner, a connecting patch 60 made of elastomer material (such as illustrated in FIG. 3) makes it possible to fix the device 1 covered with the protective shroud 50 on an inner surface of the tyre P, in particular on an edge of said tyre P. The patch covers the device 1 and a part of the inner surface around said device, while the bottom of the second portion 10.2 of the housing 10 extends into the vicinity of the inner surface of the tyre P. The material in which the patch 60 is made is not cohesive with it in which the protective shroud 50 is made, which enables a reuse of the device 1, for example in another tyre.

The aircraft is equipped with a radio transceiver tuned on emission and reception frequencies of the radio transceiver 31 of the pressure measuring device 1.

In operation, the pressurised air contained in the inner volume V defined by the rim J and the tyre P penetrates, via the first channels 11 of the housing 10, in the first volume V1. The first channels 11 perform a first filtering of the particles at the input of the inner volume V. A second filtering of air is performed by the second channels during the passage of the air from the first volume V1 to the second volume V2. The air present in the second volume V2 then penetrates into the enclosure defined by the cap of the pressure sensor 30 via the third channel and acts on the membrane. Under the effect of the pressure of the air in the enclosure, the membrane is deformed and the electrical resistance associated with said membrane is modified. A analogue-to-digital converter integrated in the microcontroller 32 converts the capacity of the condenser into a pressure value which is then sent to the radio transceiver of the aircraft using the radio transceiver 31 of the pressure measuring device 1.

The first lug 12.1 and the second lug 12.2 of the housing 10 are opposing, during the rotation of the tyre P, to deformations of the first sections 41.1, 41.2 and of the second sections 42.1, 42.2 of the wires 40.1, 40.2. They therefore make it possible to limit the stresses locally close to the proximal ends of said wires 40.1, 40.2 which are galvanically connected to the radio transceiver 31. The risks of breaking of the wires 40.1, 40.2 at their connection with the electronic board 20 are thus limited.

Figure 5A:
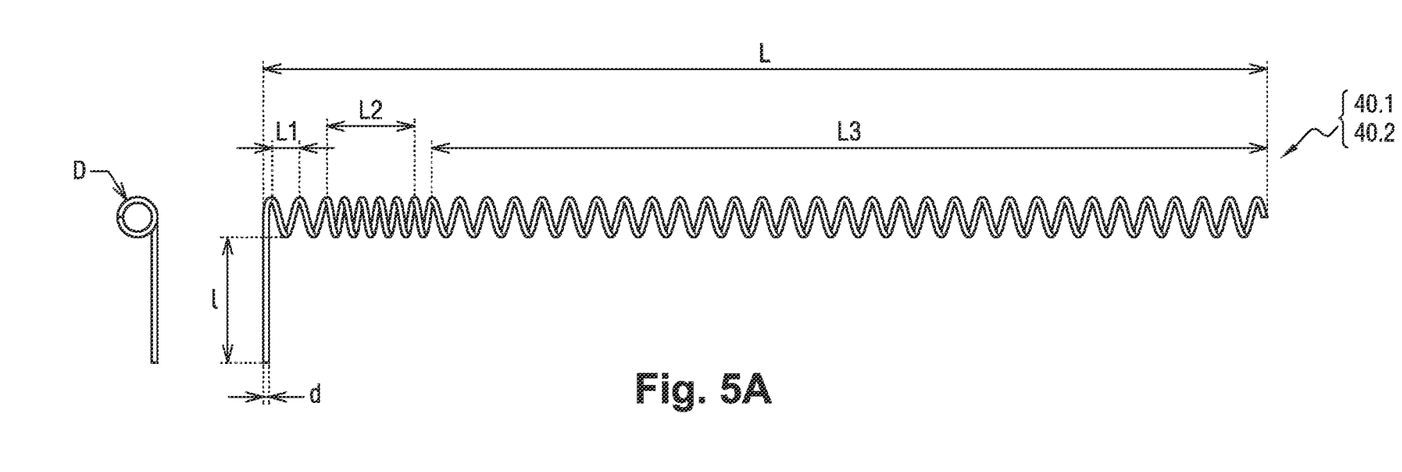
FIG. 5A is a first example of an spring antenna for the pressure measuring device illustrated in FIG. 1A.
Figure 5B:
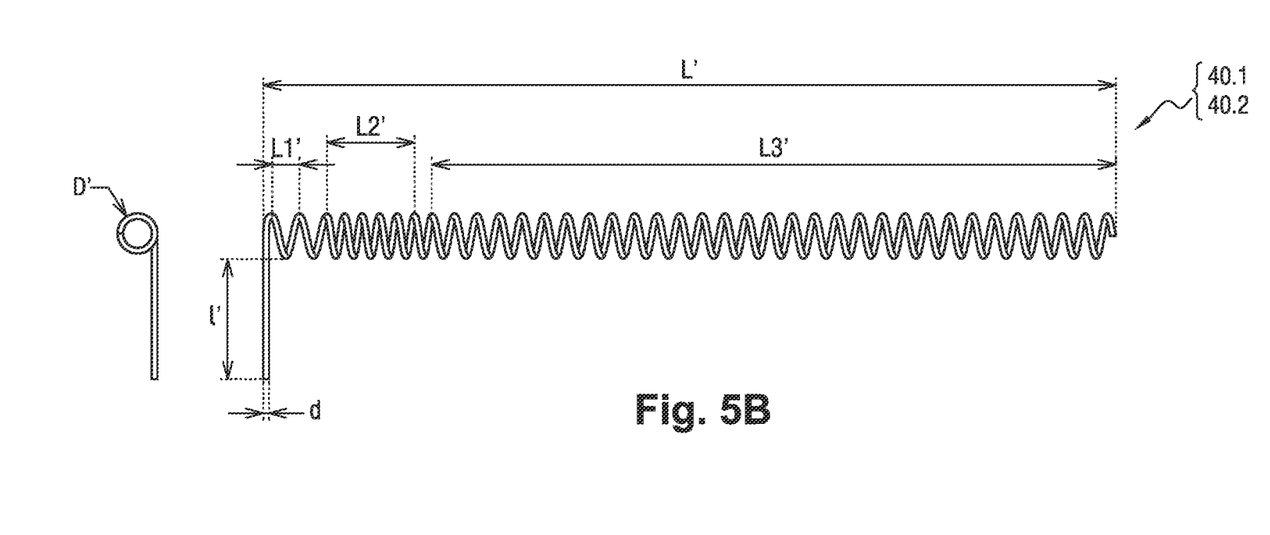
FIG. 5B is a second example of a spring antenna for the pressure measuring device illustrated in FIG. 1A.

As the proximal ends move away from the wires 40.1, 40.2, it is advantageous to readjust the rigidity of said antennas by modulating, for example, the pitch of the helical shape of these at the same winding diameter, in order to improve their performances in terms of emission and reception, without degrading their mechanical endurance vis-à-vis the stresses that it they undergo. FIGS. 5A and 5B respectively illustrate the dimensional features of a first version and a second version of straight-winding wire 40.1, 40.2, here offering a good compromise between mechanical endurance and emission/reception performance.

In the first version (FIG. 5A), the wire 40.1, 40.2 has, as an example, the following dimensional features:
 a wire diameter d equal to 0.225 mm;
un diamètre d'enroulement externe D égal à 1.6 mm;
 a total winding length L equal to 40.2 mm;
 a first section comprising a spire extending over a length L1 equal to 1.1 mm;
 a second section comprising five spires extending over a length L2 equal to 3.5 mm;
 a third section comprising thirty spires extending over a length L3 equal to 33 mm;
 a rectilinear end portion of length l equal to 5 mm.
In the second version (FIG. 5B), the wire 40.1, 40.2 has, as an example, the following dimensional features:
 a wire diameter d' equal to 0.225 mm;
 an outer winding diameter D' equal to 1.8 mm;
 a total winding length L' equal to 34.1 mm;
 a first section comprising a spire extending over a length L1' equal to 1.1 mm;
 a second portion comprising five spires extending over a length L2' equal to 3.5 mm;
 a third portion comprising thirty spires extending over a length L3' equal to 27 mm;
 a rectilinear end portion of length l' equal to 5 mm.

In these two examples, the first and third sections have a P/D ratio less than 0.7. The second section has a P/D ratio less than that of the first and third sections.

Figure 6A:
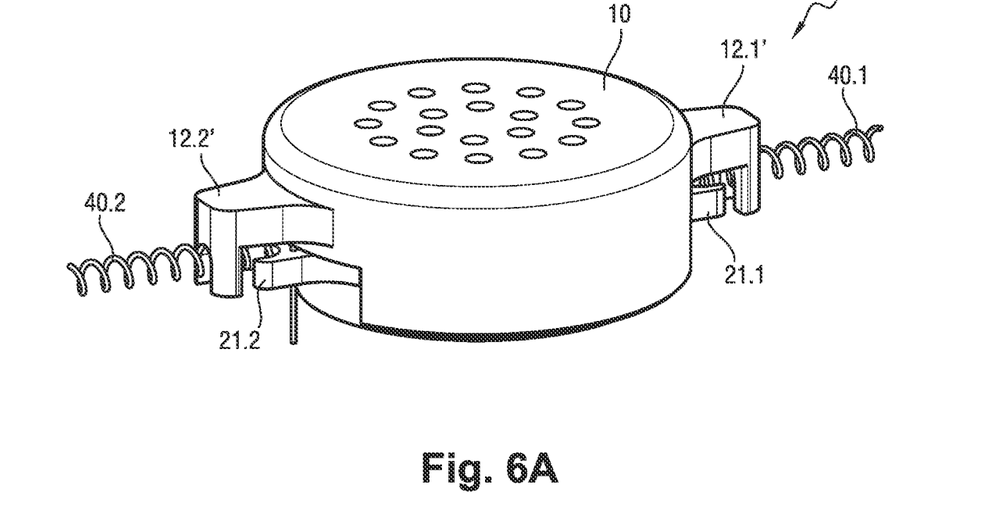
FIG. 6A is a perspective view of a variant of the pressure measuring device illustrated in FIG. 1A.
Figure 6B:
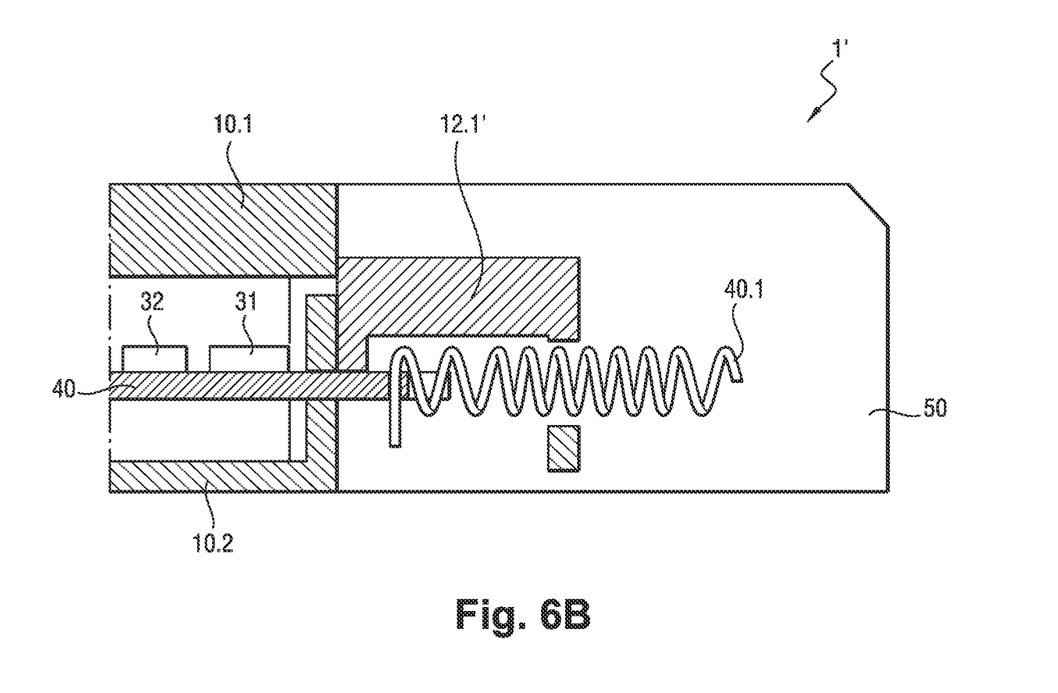
FIG. 6B is a schematic, cross-sectional view of the pressure measuring device illustrated in FIG. 6A.

FIGS. 6A and 6B illustrate a pressure measuring device 1' which is a variant of the device 1 illustrated in FIG. 1A. The device 1' differs from the device 1 in that the first lug 12.1' and the second lug 12.2' are carried by the first portion 10.1 of housing 10 and not by the second portion 10.2 of housing 10.

Figure 7A:
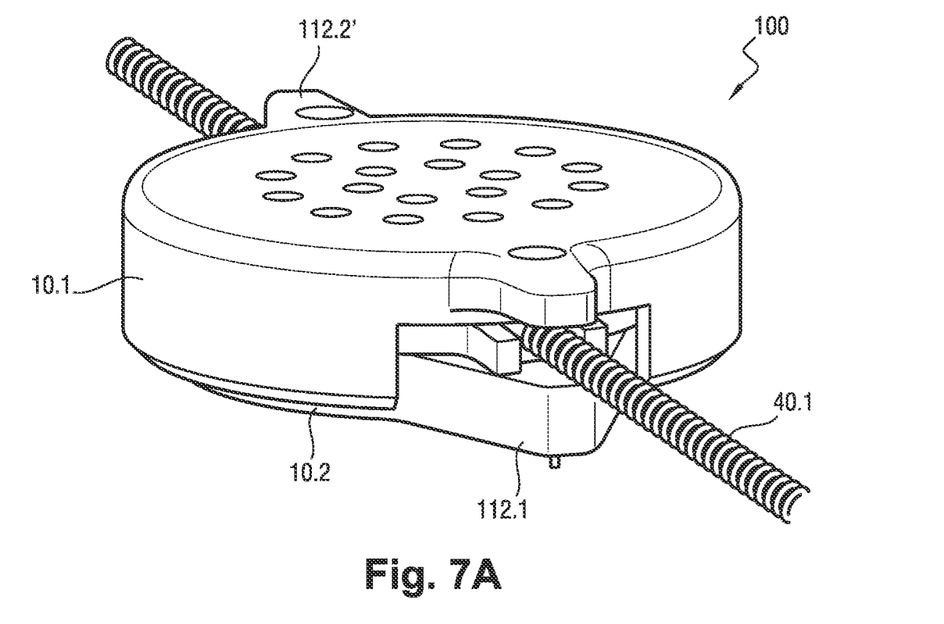
FIG. 7A is a perspective view of a pressure measuring device according to a second embodiment of the invention.
Figure 7B:
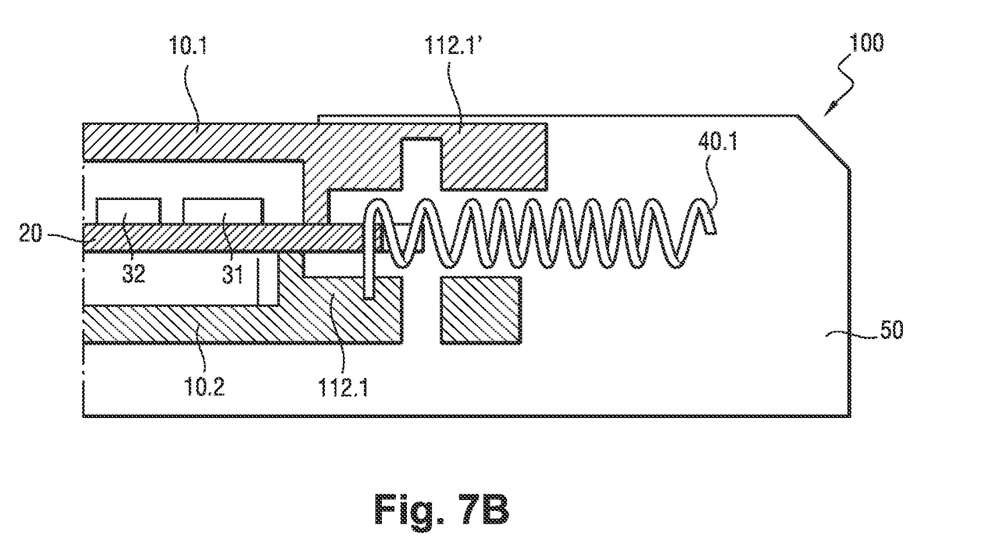
FIG. 7B is a schematic, cross-sectional view of the pressure measuring device illustrated in FIG. 7A.

FIGS. 7A and 7B illustrate a pressure measuring device 100 according to a second embodiment of the invention. The device 100 differs from the devices 1, 1' in that the first portion 10.1 and the second portion 10.2 of housing 10 each comprise two projecting lugs 112.1, 112.1', 112.2, 112.2' which extend two-by-two facing one another.

The lugs 112.1', 112.2' comprise an outer surface extending the upper face of the housing 10 and the lugs 112.1, 112.2 comprise an outer surface extending the bottom of the housing 10. The lugs 112.1, 112.1', 112.2, 112.2', with no projecting fingers, each comprise an inner surface extending horizontally and substantially tangentially to the wires 40.1, 40.2.

Advantageously, the lugs 112.1', 112.2' comprise a through hole forming an anchoring of the protective shroud 50 to the housing 10, the elastomer material of the protective shroud 50 not adhering to the resin of the housing 10.

Figure 8A:
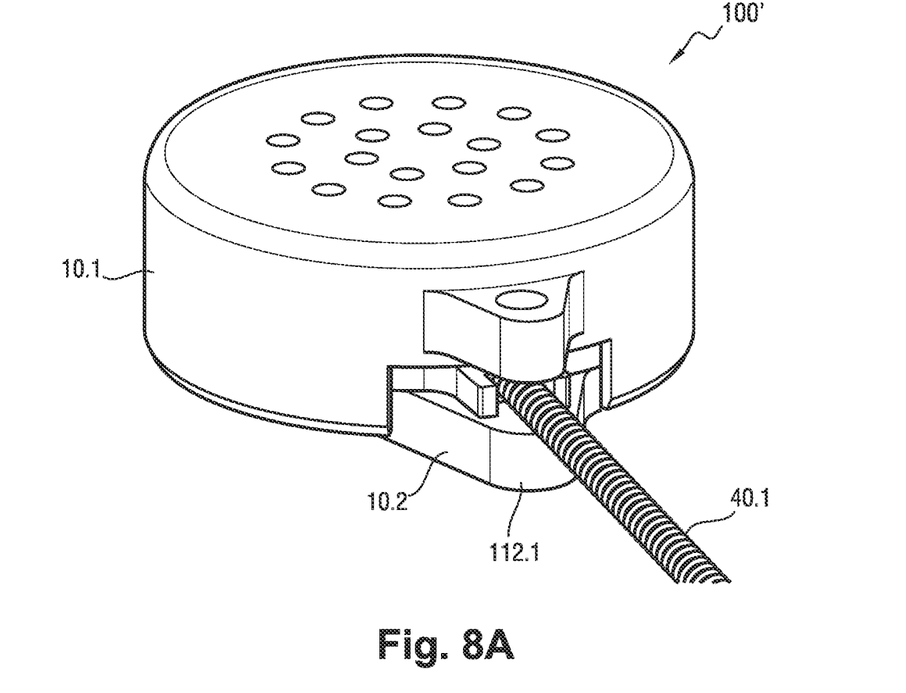
FIG. 8A is a perspective view of a variant of the pressure measuring device illustrated in FIG. 7A.
Figure 8B:
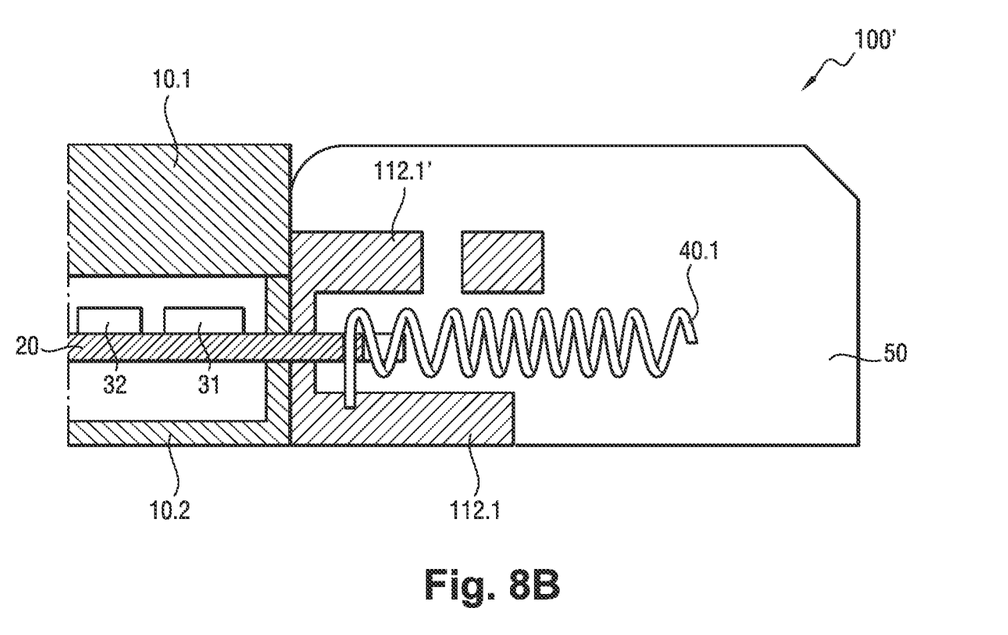
FIG. 8B is a schematic, cross-sectional view of the pressure measuring device illustrated in FIG. 8A.

FIGS. 8A and 8B illustrate a pressure measuring device 100' which is a variant of the device 100 illustrated in FIG. 7A. The pressure measuring device 100' differs from the device 100 in that the outer surfaces of the lugs 112.1', 112.2' extend at a distance from the upper surface of the housing 10. The position of the device 1 in the protective shroud 50 is also modified.

Naturally, the invention is not limited to the embodiment described, but covers any variant coming within the scope of the invention as defined by the claims.

Although here, the pressure measuring device comprises a phenolic resin housing, the invention also applies to other types of housings, like for example a metal or thermoplastic material, carbon fibre, polycarbonate, PEEK, epoxy-based material, or other housing.

Although here, the housing is cylindrical in shape, the invention applies to housings of other shapes, for example such as a housing that is egg-shaped, or of rectangular box shape, or of any shape.

The antenna can be constituted of one or more metal wires wound into a spring.

Although here, the first channels, the second channels and the third channel have a circular section, the invention also applies to first channels, second and/or a third channel of different section, like for example, a square or other section.

Although here, the pressure measuring device comprises a microcontroller, the invention also applies to other signal processing means, like for example an FPGA, logic gates, or a microprocessor.

The invention applies to any means for connecting components to the electronic circuit, like for example by wire, welding/soldering, broaching or sintering connections on a PCB-type support.

Although here, the pressure measuring device comprises a radio transceiver (for example, of "RFID"-type), the invention applies to any type of wireless emitting techniques, like for example, a "LoRa", "Sigfox", "NFC", "edge", "Wi-Fi", "Bluetooth", ultrasound or "IoT"-type 2G, 3G, 4G, 5G protocol. It will be provided to integrate a battery to the pressure measuring device, if it is necessary to supply the transceiver.

Although here, the measuring device is placed in an aircraft wheel, the invention also applies to other vehicles, like for example, lorries or motor vehicles.

Although here, the tyre is filled with pressurised air, the invention also applies to tyres filled with other types of pressurised fluid, like for example, inert gases, such as nitrogen.

Although here, the pressure sensor is of the piezoresistive type, the invention also applies to other types of pressure sensors, like for example, a resistive, inductive, capacitive, piezoelectric or resonating sensor.

Although here, the electronic board is connected by glue beads to the housing, the invention also applies to other types of connection between the housing and the electronic board, like for example one or more elastomer pins extending from the first surface of the electronic board, to the first portion of the housing and one or more elastomer pins extending from the second surface of the electronic board to the second face of the housing. Furthermore, although here, the electronic board is fixed to the housing using silicone-based flexible glue beads, the invention also applies to other types of connection between the housing and the electronic board enabling a relative movement of the housing and of the electronic board, like for example, a synthetic or natural seal of the rubber or EPDM type.

The pressure measuring device can also comprise a temperature sensor for transmitting the temperature and/or performing a temperature compensation of the measurement of the pressure sensor. The measurement of the temperature can be taken by a dedicated sensor or also be measured on a piezoresistive sensor by the measurement of the input resistance of the sensitive element or by any other combination of resistances of a piezoresistive sensor, the result of which would only provide an image of the temperature, that of the pressure being removed in the combination performed (resistances working longitudinally or transversally, respectively giving positive and negative gauge factors).

For measurement redundancy reasons, it can be considered to place several pressure measuring devices in one same tyre.

The protective shroud can only partially cover the first and/or the second antenna.

Although here, the first and second antenna wires 40.1, 40.2 are constituted of a helical-shaped steel wire wound in a spring, they can also be constituted of a wire made of a material other than steel and wound in a shape other than helical (straight, wavy, meander, etc.).

The bottom of the housing can bear directly against the inner surface of the tyre or indirectly via an interface like a fixing or decoupling interface.

Although here, the measuring device comprises a pressure and/or temperature sensor, it can also comprise any type of sensor enabling a measurement of an operating variable of the tyre, such as an angular position, a rotation speed, an acceleration, a magnetic field, a humidity, a corrosion, etc.

The invention claimed is:

1. A device for measuring an operating variable to be fitted onto a tire, comprising:
   an electronic circuit distributed over a first face of an electronic board and which comprises a sensor;
   a protective case delimiting an enclosure in which extends at least partially the electronic circuit; and
   at least one first antenna wire having one end galvanically connected to the electronic circuit and integrally extending outside of the enclosure so as to project laterally from the protective case,
   wherein the protective case is provided with a lateral portion which projects substantially tangentially to a proximal end portion of the first antenna wire in accordance with a generatrix of said first antenna wire.

2. The device according to claim 1, wherein the protective case comprises a first portion partially covering the first face, and a second portion partially covering a second face of the electronic board opposite the first face and having at least one bottom intended to extend to the vicinity of an inner surface of the tire.

3. The device according to claim 1, wherein the protective case comprises at least one channel putting the electronic board in fluid communication with the outside of the protective case.

4. The device according to claim 1, wherein the generatrix of the first antenna wire is parallel to the first face.

5. The device according to claim 1, wherein the lateral portion comprises at least one finger substantially tangentially to the proximal end section of the first antenna wire in a plane perpendicular to the first face.

6. The device according to claim 1, wherein the first antenna wire has a shape comprised in the following group: straight, helical, meander, wavy.

7. The device according to claim 1, comprising a protective shroud covering at least partially the electronic board, the protective case and the first antenna wire.

8. The device according to claim 7, wherein the protective shroud is made of elastomer material.

9. The device according to claim 8, wherein the elastomer material cross-links at a temperature less than 100° C.

10. The device according to claim 1, wherein at least one section of the first antenna wire has a geometric pattern repeated in accordance with a pitch P, the projection of the geometric pattern on a plane perpendicular to the generatrix of the first antenna wire being circumscribed in a circle of diameter D, such that P/D<0.7.

11. The device according to claim 10, wherein the first antenna wire comprises a first section facing the lateral portion of the protective case and having a first geometric pattern repeated in accordance with a first pitch, and a second portion remote from the lateral portion of the protective case and having a second geometric pattern repeated in accordance with a second pitch, the first pitch being greater than the second pitch.

12. The device according to claim 1, comprising a second antenna antenna wire comprising an end galvanically connected to the electronic circuit and extending so as to project laterally from the protective case so as to form a dipole antenna with the first antenna wire.

13. A tire comprising a measuring device according to claim 1 and an element for fixing the device on an inner surface of the tire.

14. The tire according to claim 13, wherein the fixing element is a patch covering the device and a part of the inner surface around the device.

15. A wheel comprising the tire according to claim 13.

16. An aircraft landing gear comprising at least one wheel according to claim 15.

17. The device according to claim 8, wherein the protective shroud is made of a silicone-based elastomer.

* * * * *